United States Patent
Mehra et al.

(10) Patent No.: US 12,533,522 B2
(45) Date of Patent: Jan. 27, 2026

(54) TELEMETRY CONNECTION FOR MEDICAL DEVICES

(71) Applicant: Medtronic, Inc., Minneapolis, MN (US)

(72) Inventors: Ashutosh Mehra, St. Paul, MN (US); Venkat R. Gaddam, Plymouth, MN (US); Nathan A. Torgerson, Andover, MN (US); Bernard P. Bechara, Minneapolis, MN (US); Joel A. Anderson, Brooklyn Park, MN (US); Arthur K. Lai, Minnetonka, MN (US); Brent P. Johnson, Shoreview, MN (US); Trevor D. Webster, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 400 days.

(21) Appl. No.: 18/341,331

(22) Filed: Jun. 26, 2023

(65) Prior Publication Data

US 2024/0001128 A1  Jan. 4, 2024

Related U.S. Application Data

(60) Provisional application No. 63/367,245, filed on Jun. 29, 2022.

(51) Int. Cl.
*A61N 1/372* (2006.01)

(52) U.S. Cl.
CPC ..... *A61N 1/37252* (2013.01); *A61N 1/37223* (2013.01)

(58) Field of Classification Search
CPC .................. A61N 1/37223; A61N 1/37252
See application file for complete search history.

(56) References Cited

U.S. PATENT DOCUMENTS

| 9,844,676 B2 | 12/2017 | Zhang et al. |
| 11,202,325 B2 | 12/2021 | Wu et al. |

(Continued)

OTHER PUBLICATIONS

"Bluetooth Connection Flowcharts", Silicon Labs, https://docs.silabs.com/bluetooth/3.2/general/connections/bluetooth-connection-flowcharts, accessed on Jan. 6, 2022, 6 pp.

*Primary Examiner* — William J Levicky
(74) *Attorney, Agent, or Firm* — Shumaker & Sieffert, P.A.

(57) ABSTRACT

An example system includes telemetry circuitry configured for communication between a medical device and an external device associated with the medical device and processing circuitry. The processing circuitry is configured to receive, with the telemetry circuitry, an advertisement from the medical device. The advertisement includes connection parameters for a potential communication session with the medical device and an indication that the medical device is connected by an established communication session between the medical device and a connected device. The processing circuitry is further configured to identify the connected device using the indication of the advertisement, initiate a communication session between the telemetry circuitry and the connected device, and output, with the telemetry circuitry and using the communication session between the telemetry circuitry and the connected device, a request for information from the medical device.

20 Claims, 9 Drawing Sheets

(56) References Cited

U.S. PATENT DOCUMENTS

| | | | |
|---|---|---|---|
| 2017/0216611 A1* | 8/2017 | Yoder | A61N 1/37252 |
| 2017/0312530 A1* | 11/2017 | Schilling | A61N 1/37223 |
| 2018/0200525 A1* | 7/2018 | Schilling | A61N 1/37252 |
| 2019/0282819 A1 | 9/2019 | Schilling et al. | |
| 2020/0129773 A1 | 4/2020 | Eisele et al. | |
| 2021/0146145 A1 | 5/2021 | Yoder et al. | |
| 2021/0162225 A1 | 6/2021 | Beguin | |

* cited by examiner

TELEMETRY CONNECTION FOR MEDICAL DEVICES

This application claims the benefit of U.S. Provisional Patent Application No. 63/367,245, filed 29 Jun. 2022, the entire contents of which is incorporated herein by reference.

TECHNICAL FIELD

This disclosure generally relates to electrical stimulation therapy.

BACKGROUND

Medical devices may be external or implanted, and may be used to sense neural signals (e.g., central and peripheral nerves) and/or deliver electrical stimulation therapy to various tissue sites of a patient to treat a variety of symptoms or conditions such as, for example, one or more of chronic pain, tremor, Parkinson's disease, other movement disorders, epilepsy, urinary or fecal incontinence, sexual dysfunction, obesity, gastroparesis, sleep apnea, neural control of prosthetic devices, or stimulation to provide peripheral sensation. A medical device delivers electrical stimulation therapy via one or more leads that include electrodes located proximate to target locations associated with the brain, the spinal cord, pelvic nerves, peripheral nerves, or the gastrointestinal tract of a patient. For bipolar stimulation, the electrodes used for stimulation may be on one or more leads. For unipolar stimulation, the electrodes may include one or more leads and an electrode on a stimulator housing located remotely from the target site (e.g., near clavicle). It may be possible to use leadless stimulation using electrodes mounted on the stimulator housing. Hence, electrical stimulation is used in different therapeutic applications, such as deep brain stimulation (DBS), spinal cord stimulation (SCS), pelvic stimulation, gastric stimulation, or peripheral nerve field stimulation (PNFS).

A clinician may select values for a number of programmable parameters in order to define the electrical stimulation therapy to be delivered by the implantable stimulator to a patient. For example, the clinician may select one or more electrodes for delivery of the stimulation, a polarity of each selected electrode, a voltage or current pulse amplitude, a pulse width, and a pulse rate as stimulation parameters. A set of parameters, such as a set including electrode combination, electrode polarity, amplitude, pulse width, and pulse rate, may be referred to as a program in the sense that they define the electrical stimulation therapy to be delivered to the patient.

SUMMARY

This disclosure describes example techniques for using an advertisement to transfer information from a medical device (e.g., an implantable medical device) to an external device associated with the medical device to improve responsiveness of communication between the external device and the medical device while minimizing energy drain of either the medical device, the external device, or both. In this example, the medical device may output an advertisement indicating both information for establishing a connection with the medical device and one or more parameters, such as, for example, a flag indicating whether the medical device is currently in a session with a device (e.g., a recharger device, a clinician programmer, a patient programmer, etc.). In this example, the external programmer may establish a connection with the connected device to collect information, which may reduce an energy usage of the medical device. In some examples, the one or more parameters may include, for example, a battery status notification indicating whether the battery has a voltage and/or charge that is less than a threshold.

In one example, a system includes telemetry circuitry configured for communication between a medical device and an external device associated with the medical device and processing circuitry. The processing circuitry is configured to receive, with the telemetry circuitry, an advertisement from the medical device. The advertisement includes connection parameters for a potential communication session with the medical device and an indication that the medical device is connected by an established communication session between the medical device and a connected device. The processing circuitry is further configured to identify the connected device using the indication of the advertisement, initiate a communication session between the telemetry circuitry and the connected device, and output, with the telemetry circuitry and using the communication session between the telemetry circuitry and the connected device, a request for information from the medical device.

In another example, a method includes receiving, by processing circuitry, an advertisement from a medical device. The advertisement includes connection parameters for a potential communication session with the medical device and an indication that the medical device is connected by an established communication session with a connected device. The method further includes identifying, by the processing circuitry, the connected device using the indication of the advertisement and initiating, by the processing circuitry, a communication session with the connected device. The method further includes outputting, by the processing circuitry and using the communication session with the connected device, a request for information from the medical device.

In one example, a computer-readable storage medium is described herein having stored thereon instructions that, when executed, cause processing circuitry to receive an advertisement from a medical device. The advertisement includes connection parameters for a potential communication session with the medical device and an indication that the medical device is connected by an established communication session with a connected device. The instructions further cause the processing circuitry to identify the connected device using the indication of the advertisement and initiate a communication session with the connected device. The instructions further cause the processing circuitry to output, using the communication session with the connected device, a request for information from the medical device.

In another example, a medical device including telemetry circuitry configured for communication between the medical device and an external device associated with the medical device and processing circuitry. The processing circuitry is configured to establish, with the telemetry circuitry, a communication session to connect a device to the medical device and determine an indication for the connected device. The processing circuitry is further configured to generate an advertisement comprising connection parameters for a potential communication session with the medical device and an indication that the medical device is connected by the established communication session between the connected device and the medical device and output the advertisement comprising the indication that the medical device is connected by the established communication session between the connected device and the medical device.

In one example, a method includes establishing, by processing circuitry, a communication session to connect a device to a medical device and determining, by the processing circuitry, an indication for the connected device. The method further includes generating, by the processing circuitry, an advertisement comprising connection parameters for a potential communication session with the medical device and an indication that the medical device is connected by the established communication session between the connected device and the medical device and outputting, by the processing circuitry, the advertisement comprising the indication that the medical device is connected by the established communication session between the connected device and the medical device.

In another example, a computer-readable storage medium is described herein having stored thereon instructions that, when executed, cause processing circuitry to establish a communication session to connect a device to a medical device and determine an indication for the connected device. The instructions further cause the processing circuitry to generate an advertisement comprising connection parameters for a potential communication session with the medical device and an indication that the medical device is connected by an established communication session between the connected device and the medical device and output the advertisement comprising the indication that the medical device is connected by the established communication session between the connected device and the medical device.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
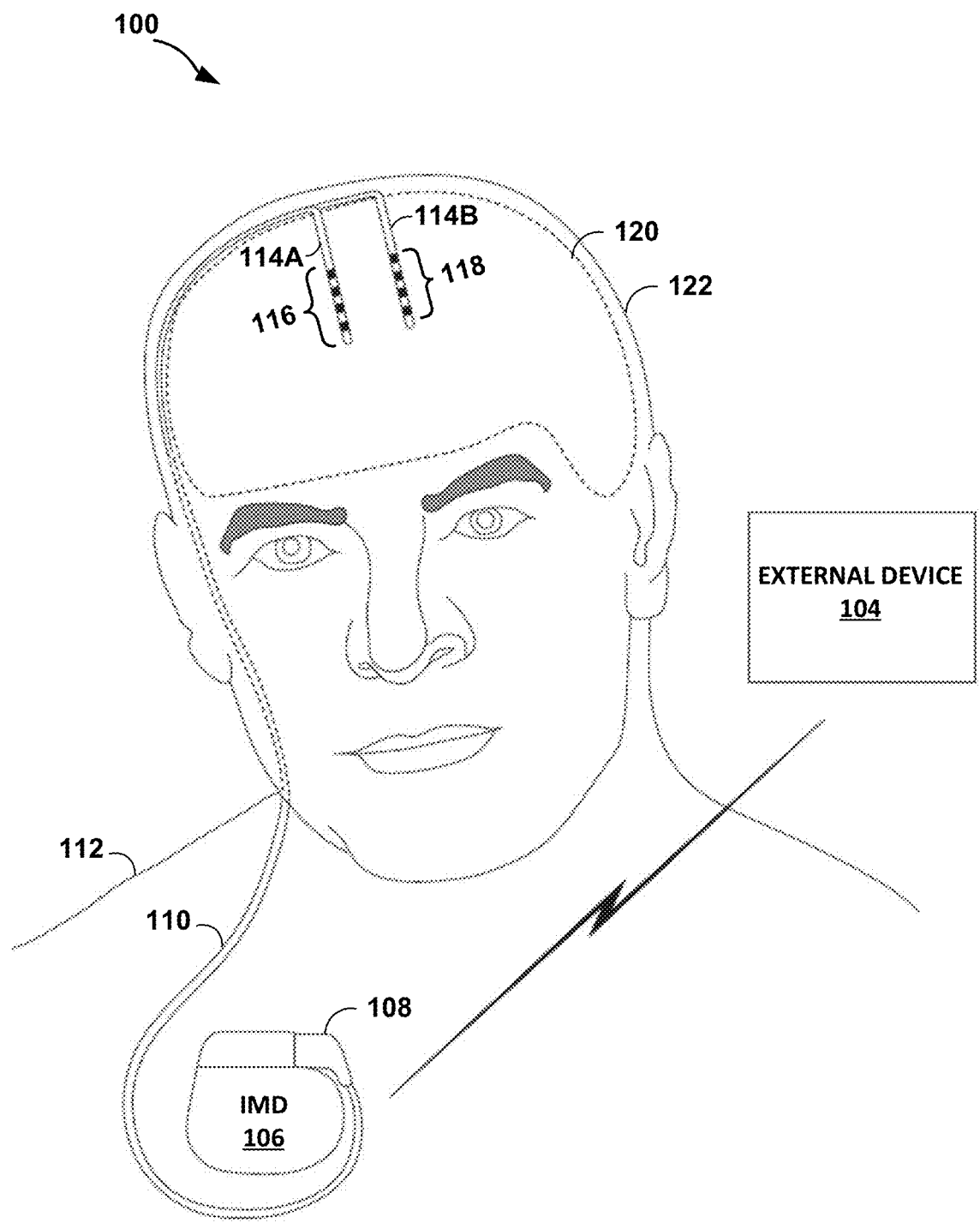
FIG. 1 is a conceptual diagram illustrating an example system that includes an implantable medical device (IMD) configured to deliver electrical stimulation to a patient according to an example of the techniques of the disclosure.

This disclosure describes example techniques for systems configured to deliver electrical stimulation therapy (e.g., neuromodulation such as deep brain stimulation (DBS), spinal cord stimulation (SCS), sacral nerve stimulation (SNS), or peripheral nerve stimulation therapy). For example, the system may be configured to adjust program parameters for a medical device (e.g., an implanted medical device) using an external programmer, such as, a clinician programmer or a patient programmer. Electrical stimulation therapy may be delivered via multiple electrodes of one or more leads (e.g., cylindrical or paddle leads) implanted to provide stimulation in the brain, in the spinal cord, in the sacral nerve, or the percutaneous tibial nerve stimulation of a patient. In some examples, electrical stimulation therapy may be delivered via a leadless device. Electrical stimulation therapy may be adaptively adjusted for a patient using at least one program parameter.

For example, sensing circuitry may sense one or more bioelectric signals of a brain or nerve of a patient and stimulation generation circuitry may generate the electrical stimulation based on the one or more bioelectric signals. However, techniques described herein may apply to all types of medical devices (e.g., implantable medical devices), particularly those that have a patient programmer as an external device where, for purposes of user experience, the response of the interaction between the patient and the external device should appear to be minimal (e.g., no delay, a 1-5 second delay, 5-10 second delay, less than a 30 second delay, etc.) when the patient requests to perform an action on the external device. This may directly apply to neuromodulation devices such as, for example, spinal cord stimulation (SCS) devices, deep brain stimulation (DBS) devices, sacral nerve stimulation (SNS) devices, or peripheral nerve stimulation therapy.

Neuromodulation telemetry systems may use Bluetooth™ (ISM bands from 2.402 to 2.48 GHz) or other wireless technology protocols (e.g., RF protocols) to implement communication with programming instruments including proprietary external programmers and commercial off-the-shelf instruments such as cellphones and tablets. Access to external instruments may help to enable recharge and product longevity, and may help to prevent high risk procedures like replacement surgeries for implantable medical devices. Impact of high frequency protocols may be high on device longevity and is directly proportional to connection/advertising intervals. Faster advertising leads to faster connection and reduced latency, but also higher current drain and reduced device longevity.

The energy used to either maintain a distance telemetry session or make an implantable medical device immediately responsive for the user can consume a significant proportion of the energy from an implantable device, which may reduce device longevity. Techniques described herein may configure a system to use the advertisement itself to include a payload to indicate, for example, when the medical device has established a communication session with another device. For example, in response to determining that the medical device has established a communication session with an clinician programmer, a patient programmer may request information from the clinician programmer instead of the medical device, which may improve the response time and usability of the system while being able to reduce the communication energy drain of the medical device.

Implantable medical devices (IMD) with limited battery capacity (e.g., a primary battery and/or a rechargeable battery) may benefit from techniques for establishing connections and transferring parameters with instruments. The IMD may communicate via a wireless protocol (e.g., Bluetooth or another protocol) to a number of different instruments, such as, for example, a patient programmer, a clinician programmer, a recharger device (also referred to herein as simply "recharger"), a programming fob, or another device. The IMD may spend a large current drain in establishing connections and would benefit by efficiently evaluating if establishing a communication session is needed. As a peripheral in the IMD performs advertisements, the advertisements themselves could be used for transferring system parameters through the advertising payload of an advertisement and may help to achieve system level functionality without actually establishing a communication session directly with the medical device.

Techniques described herein may use the advertising payload of an advertisement to help to communicate system communication parameters with multiple intended instruments. The techniques may help to allow communication sessions (e.g., Bluetooth sessions) to be established more efficiently, with minimum power wastage and enable faster response reducing system latency and improving patient experience. In some examples, central devices can send a scan request to the IMD. In this example, the IMD may provide a scan response payload, which may include a payload to relay information similar to using the advertising payload.

Techniques described herein may configure a system to change an advertisement (e.g., a Bluetooth™ advertisement or another advertisement) of the medical device (e.g., an implanted medical device) to include a payload. The payload may include various information, such as, for example, an indication of a battery level at the medical device or an indication of whether the medical device has established a communication session that remains in operation. In this way, the medical device may initiate and/or establish fewer communication sessions, which may help to save energy stored by the medical device, while also allowing the information to be provided using an existing communication session, which may reduce a delay in the information being provided to the patient or a caretaker of the patient. Saving energy may help to optimize telemetry performance and/or efficiency, which can help make the medical device (e.g., an implanted medical device) last longer.

For example, the medical device (e.g., an implantable neurostimulator) may be in a session with a recharger device and a programmer handset sends a scan request. The advertising payload of the advertisement from the medical device may include a flag that the medical device is in a communication session with the recharger device and that the recharge information can be gathered from the recharger device instead of spending the power and/or disrupting the recharge session to connect to the medical device. For example, the programmer handset may determine that the recharge information can be gathered from the recharger device using a prioritizing bit for each instrument.

In some examples, the medical device may output a battery status notification to the patient without initiating a session if the advertising payload of the advertisement includes, for example, a battery status flag indicating to the scanner that the battery level (e.g., a voltage or charge level) is below a certain threshold. For example, the programmer handset may determine that the battery level is below the certain threshold when the advertisement includes a battery status flag set to indicate that the battery level is below the certain threshold (e.g., a 0 or 1).

An example problem being addressed in this disclosure is to have a more functional connection such that the device longevity is improved while not adversely impacting a user experience of connection latency. Techniques described herein include "smart" wireless connectivity (e.g., radiofrequency telemetry) by, for example, including information in a payload of an advertisement itself, which may improve device longevity. For example, the medical device may output the advertisement for a connection between the medical device and an external based on an advertising interval. As used herein, an advertisement for a connection may include one or more packets (e.g., one or more advertisement packets) sent to inquire whether communication should be initiated. An advertising interval may refer to a rate at which an advertising device (e.g., a medical device) outputs the advertisement. For example, the medical device may periodically output an advertisement for connection (e.g., an advertisement packet) at an advertising interval (e.g., less than 100 ms, 100 ms to 500 ms, 1 second, more than 1 second, etc.) with an optional random delay. An advertising device (e.g., the medical device) may broadcast the advertisement for connection at the advertising interval to two unconnected devices such that more than one device can listen and establish a connection with the advertising device using the advertisement for connection. The advertisement for connection may include information on how to connect with the advertising device, such as, for example, one or more of: (1) media access control (MAC) addresses for the medical device and external device; (2) a real time-point in time for the transfer to start; (3) an indication of a starting frequency; (4) an indication of a hop set; (5) a connection interval; or (6) a connection latency.

FIG. 1 is a conceptual diagram illustrating an example system 100 that includes an implantable medical device (IMD) 106 configured to deliver adaptive deep brain stimulation (DBS) to a patient 112. Although the examples described in this disclosure are generally applicable to a variety of medical devices including external devices and IMDs, application of such techniques to IMDs and, more particularly, implantable electrical stimulators (e.g., neurostimulators) will be described for purposes of illustration. More particularly, the disclosure will refer to an implantable DBS system for purposes of illustration, but without limitation as to other types of medical devices or other therapeutic applications of stimulation. For example, in some examples, one or more components of system 100 may be configured to deliver one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS), or any other stimulation therapy capable of treating a condition of patient 122.

DBS may be adaptive in the sense that IMD 106 may adjust, increase, or decrease the magnitude of one or more parameters of the DBS in response to changes in patient activity or movement, a severity of one or more symptoms of a disease of the patient, a presence of one or more side effects due to the DBS, or one or more sensed signals of the patient. For instance, one example of system 100 is a bi-directional DBS system with capabilities to both deliver stimulation and sense intrinsic neuronal signals. System 100 may provide for "closed-loop" therapy where IMD 106 may continuously monitor the state of certain biomarker signals and deliver stimulation according to pre-programmed routines based on the biomarker signals.

System 100 may be configured to treat a patient condition, such as a movement disorder, neurodegenerative impairment, a mood disorder, or a seizure disorder of patient 112. Patient 112 ordinarily is a human patient. In some cases, however, therapy system 100 may be applied to other mammalian or non-mammalian, non-human patients. While movement disorders and neurodegenerative impairment are primarily referred to herein, in other examples, therapy system 100 may provide therapy to manage symptoms of other patient conditions, such as, but not limited to, seizure disorders (e.g., epilepsy) or mood (or psychological) disorders (e.g., major depressive disorder (MDD), bipolar disorder, anxiety disorders, post-traumatic stress disorder, dysthymic disorder, and obsessive-compulsive disorder (OCD)) as well as, for example, neural control of prosthetic devices or stimulation to provide sensory feedback to the patients. At least some of these disorders may be manifested in one or more patient movement behaviors. A movement disorder or other neurodegenerative impairment may include symptoms such as, for example, muscle control impairment, motion impairment or other movement problems, such as rigidity, spasticity, bradykinesia, rhythmic hyperkinesia, nonrhythmic hyperkinesia, and akinesia. In some cases, the movement disorder may be a symptom of Parkinson's disease. However, the movement disorder may be attributable to other patient conditions.

Example therapy system 100 includes medical device external device 104, implantable medical device (IMD) 106, lead extension 110, one or more leads 114A and 114B with respective sets of one or more electrodes 116, 118. In the example shown in FIG. 1, electrodes 116, 118 of leads 114A, 114B are positioned to deliver electrical stimulation to a tissue site within brain 120, such as a deep brain site under the dura mater of brain 120 of patient 112. In some examples, delivery of stimulation to one or more regions of brain 120, such as the subthalamic nucleus, globus pallidus or thalamus, may be an effective treatment to manage movement disorders, such as Parkinson's disease. Some or all of electrodes 116, 118 also may be positioned to sense neurological brain signals within brain 120 of patient 112. In some examples, some of electrodes 116, 118 may be configured to sense neurological brain signals and others of electrodes 116, 118 may be configured to deliver adaptive electrical stimulation to brain 120. In other examples, all of electrodes 116, 118 are configured to both sense neurological brain signals and deliver adaptive electrical stimulation to brain 120. In some examples, unipolar stimulation may be possible where one electrode is on the housing of IMD 106.

IMD 106 includes a therapy module (e.g., which may include processing circuitry, signal generation circuitry or other electrical circuitry configured to perform the functions attributed to IMD 106) that includes a stimulation generator configured to generate and deliver electrical stimulation therapy to patient 112 via a subset of electrodes 116, 118 of leads 114A and 114B, respectively. The subset of electrodes 116, 118 that are used to deliver electrical stimulation to patient 112, and, in some cases, the polarity of the subset of electrodes 116, 118, may be referred to as a stimulation electrode combination. As described in further detail below, the stimulation electrode combination can be selected for a particular patient 112 and target tissue site (e.g., selected based on the patient condition). The group of electrodes 116, 118 includes at least one electrode and can include a plurality of electrodes. In some examples, the plurality of electrodes 116 and/or 118 may have a complex electrode geometry such that two or more electrodes are located at different positions around the perimeter of the respective lead.

In some examples, neurological signals sensed within brain 120 may reflect changes in electrical current produced by the sum of electrical potential differences across brain tissue. Examples of neurological brain signals include, but are not limited to, bioelectric signals generated from local field potentials (LFP) sensed within one or more regions of brain 120. Electroencephalogram (EEG) signal or an electrocorticogram (ECoG) signal are also examples of bioelectric signals. For example, neurons generate the bioelectric signals, and if measured at depth, it is LFP, if measured on the cerebral cortex, it is ECoG, and if on scalp, it is EEG. In this disclosure, the term "oscillatory signal source" may be used to describe one example of a signal source that generates bioelectric signals. However, the bioelectric signals are not limited to oscillatory signals. For example purposes, the techniques are described with oscillatory bioelectric signals from an oscillatory signal source.

In some examples, the neurological brain signals that are used to select a stimulation electrode combination may be sensed within the same region of brain 120 as the target tissue site for the electrical stimulation. As previously indicated, these tissue sites may include tissue sites within anatomical structures such as the thalamus, subthalamic nucleus or globus pallidus of brain 120, as well as other target tissue sites. The specific target tissue sites and/or regions within brain 120 may be selected based on the patient condition. Thus, in some examples, both stimulation electrode combinations and sense electrode combinations may be selected from the same set of electrodes 116, 118. In other examples, the electrodes used for delivering electrical stimulation may be different than or the same as the electrodes used for sensing neurological brain signals.

Electrical stimulation generated by IMD 106 may be configured to manage a variety of disorders and conditions. In some examples, the stimulation generator of IMD 106 is configured to generate and deliver electrical stimulation pulses to patient 112 via electrodes of a selected stimulation electrode combination. However, in other examples, the stimulation generator of IMD 106 may be configured to generate and deliver a continuous wave signal, e.g., a sine wave or triangle wave. In either case, a stimulation generator within IMD 106 may generate the electrical stimulation therapy for DBS according to a selected therapy program. In examples in which IMD 106 delivers electrical stimulation in the form of stimulation pulses, a therapy program may include a set of therapy parameter values (e.g., stimulation parameters), such as a stimulation electrode combination for delivering stimulation to patient 112, pulse frequency, pulse width, and a current or voltage amplitude of the pulses. As previously indicated, the electrode combination may indicate the specific electrodes 116, 118 that are selected to deliver stimulation signals to tissue of patient 112 and the respective polarities of the selected electrodes. As described further, the electrical stimulation generated by IMD 106 may generate, for example, burst pulses, interleaved pulses, or concurrent pulses.

In some examples, electrodes 116, 118 may be radially-segmented DBS arrays (rDBSA) of electrodes. Radially-segmented DBS arrays refer to electrodes that are segmented radially along the lead. As one example, leads 114A and 114B may include a first set of electrodes arranged circumferentially around leads 114A and 114B that are all at the same height level on leads 114A and 114B. Each of the electrodes in the first set of electrodes is a separate segmented electrode and form a level of radially-segmented array of electrodes. Leads 114A and 114B may include a second set of electrodes arranged circumferentially around leads 114A and 114B that are all at the same height level on leads 114A and 114B. Each of the electrodes in the first set of electrodes is a separate segmented electrode and form a level of radially-segmented array of electrodes. The rDBSA electrodes may be beneficial for directional stimulation and sensing.

IMD 106 may be implanted within a subcutaneous pocket above the clavicle, or, alternatively, on or within cranium 122 or at any other suitable site within patient 112. Generally, IMD 106 is constructed of a biocompatible material that resists corrosion and degradation from bodily fluids. IMD 106 may comprise a hermetic housing to substantially enclose components, such as a processor, therapy module, and memory.

As shown in FIG. 1, implanted lead extension 110 is coupled to IMD 106 via connector 108 (also referred to as a connector block or a header of IMD 106). In the example of FIG. 1, lead extension 110 traverses from the implant site of IMD 106 and along the neck of patient 112 to cranium 122 of patient 112 to access brain 120. In the example shown in FIG. 1, leads 114A and 114B (collectively "leads 114") are implanted within the right and left hemispheres (or in just one hemisphere in some examples), respectively, of patient 112 in order to deliver electrical stimulation to one or more regions of brain 120, which may be selected based on the patient condition or disorder controlled by therapy system 100. The specific target tissue site and the stimulation electrodes used to deliver stimulation to the target tissue site, however, may be selected, e.g., according to the identified patient behaviors and/or other sensed patient parameters. For example, the target tissue site may be the location of the oscillatory signal source that generates the bioelectric signal having a signal component in the beta frequency band. The stimulation electrodes used to deliver stimulation to the target tissue site may be those that are most proximal to the oscillatory signal source, e.g., using the example techniques described in this disclosure. Other lead 114 and IMD 106 implant sites are contemplated depending on clinical application or target tissue/nerve. For example, IMD 106 may be implanted on or within cranium 122, in some examples. Leads 114A and 114B may be implanted within the same hemisphere or IMD 106 may be coupled to a single lead implanted in a single hemisphere, in some examples.

Existing lead sets include axial leads carrying ring electrodes disposed at different axial positions and so-called "paddle" leads carrying planar arrays of electrodes. Selection of electrode combinations within an axial lead, a paddle lead, or among two or more different leads presents a challenge to the clinician. In some examples, more complex lead array geometries may be used. Pelvic stimulation may use cuff electrodes wrapped around the sacral (or other pelvic) nerve.

Although leads 114 are shown in FIG. 1 as being coupled to a common lead extension 110, in other examples, leads 114 may be coupled to IMD 106 via separate lead extensions or directly to connector 108. Leads 114 may be positioned to deliver electrical stimulation to one or more target tissue sites within brain 120 to manage patient symptoms associated with a movement disorder of patient 112. Leads 114 may be implanted to position electrodes 116, 118 at desired locations of brain 120 through respective holes in cranium 122. Leads 114 may be placed at any location within brain 120 such that electrodes 116, 118 are capable of providing electrical stimulation to target tissue sites within brain 120 during treatment. For example, electrodes 116, 118 may be surgically implanted under the dura mater of brain 120 or within the cerebral cortex of brain 120 via a burr hole in cranium 122 of patient 112, and electrically coupled to IMD 106 via one or more leads 114.

In the example shown in FIG. 1, electrodes 116, 118 of leads 114 are shown as ring electrodes. Ring electrodes may be used in DBS applications because ring electrodes are relatively simple to program and are capable of delivering an electrical field to any tissue adjacent to electrodes 116, 118. In other examples, electrodes 116, 118 may have different configurations. For example, at least some of the electrodes 116, 118 of leads 114 may have a complex electrode array geometry that is capable of producing shaped electrical fields. The complex electrode array geometry may include multiple electrodes (e.g., partial ring or segmented electrodes) around the outer perimeter of each lead 114, rather than one ring electrode. In this manner, electrical stimulation may be directed in a specific direction from leads 114 to enhance therapy efficacy and reduce possible adverse side effects from stimulating a large volume of tissue.

In some examples, a housing of IMD 106 may include one or more stimulation and/or sensing electrodes. In some examples, leads 114 may have shapes other than elongated cylinders as shown in FIG. 1. For example, leads 114 may be paddle leads, spherical leads, bendable leads, or any other type of shape effective in treating patient 112 and/or minimizing invasiveness of leads 114.

IMD 106 includes a memory to store a plurality of therapy programs that each define a set of therapy parameter values. In some examples, IMD 106 may select a therapy program from the memory based on various parameters, such as sensed patient parameters and the identified patient behaviors. IMD 106 may generate electrical stimulation based on the parameters of the selected therapy program to manage the patient symptoms associated with a movement disorder.

External device 104 wirelessly communicates with IMD 106 as needed to provide or retrieve therapy information. External device 104 is an external computing device that the user, e.g., a clinician and/or patient 112, may use to communicate with IMD 106. For example, external device 104 may be a clinician programmer that the clinician uses to communicate with IMD 106 and program one or more therapy programs for IMD 106. Alternatively, external device 104 may be a patient programmer that allows patient 112 to select programs and/or view and modify therapy parameters. The clinician programmer may include more programming features than the patient programmer. In other words, more complex or sensitive tasks may only be allowed by the clinician programmer to prevent an untrained patient from making undesirable changes to IMD 106.

When external device 104 is configured for use by the clinician, external device 104 may be used to transmit initial programming information to IMD 106. This initial information may include hardware information, such as the type of leads 114 and the electrode arrangement, the position of leads 114 within brain 120, the configuration of electrode array 116, 118, initial programs defining therapy parameter values, and any other information the clinician desires to program into IMD 106. External device 104 may also be capable of completing functional tests (e.g., measuring the impedance of electrodes 116, 118 of leads 114).

The clinician may also store therapy programs within IMD 106 with the aid of external device 104. During a programming session, the clinician may determine one or more therapy programs that may provide efficacious therapy to patient 112 to address symptoms associated with the patient condition, and, in some cases, specific to one or more different patient states, such as a sleep state, movement state or rest state. For example, the clinician may select one or more stimulation electrode combinations with which stimulation is delivered to brain 120. During the programming session, the clinician may evaluate the efficacy of the specific program being evaluated based on feedback provided by patient 112 or based on one or more physiological parameters of patient 112 (e.g., muscle activity, muscle tone, rigidity, tremor, etc.). Alternatively, identified patient behavior from video information may be used as feedback during the initial and subsequent programming sessions. External device 104 may assist the clinician in the creation/identification of therapy programs by providing a methodical system for identifying potentially beneficial therapy parameter values.

However, in some examples, IMD 106 or external device 104 (e.g., a clinician programmer, a patient programmer, a recharger, a programmer fob, etc.), alone or in combination, may automatically determine electrode configuration and therapy parameters. For example, the medical device may determine which electrodes to use for stimulation based on which electrodes are most proximal to the oscillatory signal source. In some examples, external device 104 may output information indicating the selected electrode configuration for stimulation and the determined stimulation amplitude or other therapy parameter for the clinician or physician to review and confirm before IMD 106 delivers therapy via the selected electrode configuration with the determined stimulation amplitude.

External device 104 may also be configured for use by patient 112. When configured as a patient programmer, external device 104 may have limited functionality (compared to a clinician programmer) in order to prevent patient 112 from altering critical functions of IMD 106 or applications that may be detrimental to patient 112. In this manner, external device 104 may only allow patient 112 to adjust values for certain therapy parameters or set an available range of values for a particular therapy parameter. For example, external device 104 may only allow patient 112 to adjust an amplitude or an intensity (by combination or amplitude, pulse width and/or pulse rate).

External device 104 may also provide an indication to patient 112 when therapy is being delivered, when patient input has triggered a change in therapy or when the power source within external device 104 or IMD 106 needs to be replaced or recharged. For example, external device 104 may include an alert LED and/or a touchscreen, may flash a message to patient 112 via a programmer display, generate an audible sound or somatosensory cue to confirm patient input was received, e.g., to indicate a patient state or to manually modify a therapy parameter.

Therapy system 100 may be implemented to provide chronic stimulation therapy to patient 112 over the course of several months or years. However, system 100 may also be employed on a trial basis to evaluate therapy before committing to full implantation. If implemented temporarily, some components of system 100 may not be implanted within patient 112. For example, patient 112 may be fitted with an external medical device, such as a trial stimulator, rather than IMD 106. The external medical device may be coupled to percutaneous leads or to implanted leads via a percutaneous extension. If the trial stimulator indicates DBS system 100 provides effective treatment to patient 112, the clinician may implant a chronic stimulator within patient 112 for relatively long-term treatment.

Although IMD 106 and system 100 are described as delivering electrical stimulation therapy to brain 120, IMD 106 and system 100 may be configured to direct electrical stimulation to other anatomical regions of patient 112. Further, an IMD may provide other electrical stimulation such as spinal cord stimulation to treat a movement disorder. For example, in some examples, an IMD may be configured to deliver one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS), or any other stimulation therapy capable of treating a condition of patient 122.

In some examples, IMD 106 may be configured to provide electrical stimulation for treatment of a patient condition supplemental to medication provided to patient 122. Although some examples are described with the use of IMD 106 that provides stimulation, the techniques are not limited and the techniques may apply to examples where no stimulation is provided. For example, IMD 106 may not provide stimulation and treatment of a patient condition of patient 122 may be provided by medication or by medication with other techniques. For instance, IMD 106 may use LFP to determine medication for one disorder of patient 122 and may apply stimulation for another disorder of patient 122. For example, patient 122 may have a dual disease like Parkinson's disease and dystonia and leads 114 are in locations to treat both Parkinson's disease and dystonia. A single IMD 106 may listen/monitor to different LFP bands to look at various medication or disease states via the same lead/same hemisphere or different hemispheres.

According to the techniques of the disclosure, IMD 106 may be configured to change an advertisement (e.g., a Bluetooth™ advertisement or another advertisement) of the medical device (e.g., an implanted medical device) to include a payload. The payload may include various information, such as, for example, an indication of a battery level at IMD 106 or an indication of whether IMD 106 has established a communication session that remains in operation. In this way, IMD 106 may initiate and/or establish fewer communication sessions, which may help to save energy stored by IMD 106, while also allowing the information to be provided using the payload of the advertisement itself and/or an existing communication session, which may reduce a delay in the information being provided to patient 112 or a caretaker of patient 112. Saving energy may help to optimize telemetry performance and/or efficiency, which can help make the battery last longer.

External device 104 (e.g., a clinician programmer, a patient programmer, a recharger, a programmer fob, etc.) may be configured to use the payload of the advertisement to more quickly identify information compared to establishing a communication session using the advertisement. For example, external device 104 may directly identify a battery level at IMD 106 using the payload. In some examples, external device 104 may use the payload to identify another device that has already established a communication session with IMD 106. In this example, external device 104 may establish a communication session with another device that has already established a communication session with IMD 106. Because the advertisement interval of the other device (e.g., an external device or an implantable device) may be shorter (e.g., less than 100 ms) compared to the advertisement interval of IMD 106 (e.g., more than 1 second), external device 104 may more quickly request information and receive information responsive to the request using both the communication session between external device 104 and the device and the communication session between the device and IMD 106. In this way, system 100 may implement smart connectivity driving optimized longevity of a battery of IMD 106 and an optimized individual tailor-made user experience that reduces a connection latency. Techniques described herein may help to allow IMD 106 to function to optimum performance levels exceling in patient experience while improving device longevity. Techniques described herein may help to allow patient 102 to use IMD 106 for a longer time, therefore reducing the risk of replacement surgeries.

Figure 2:
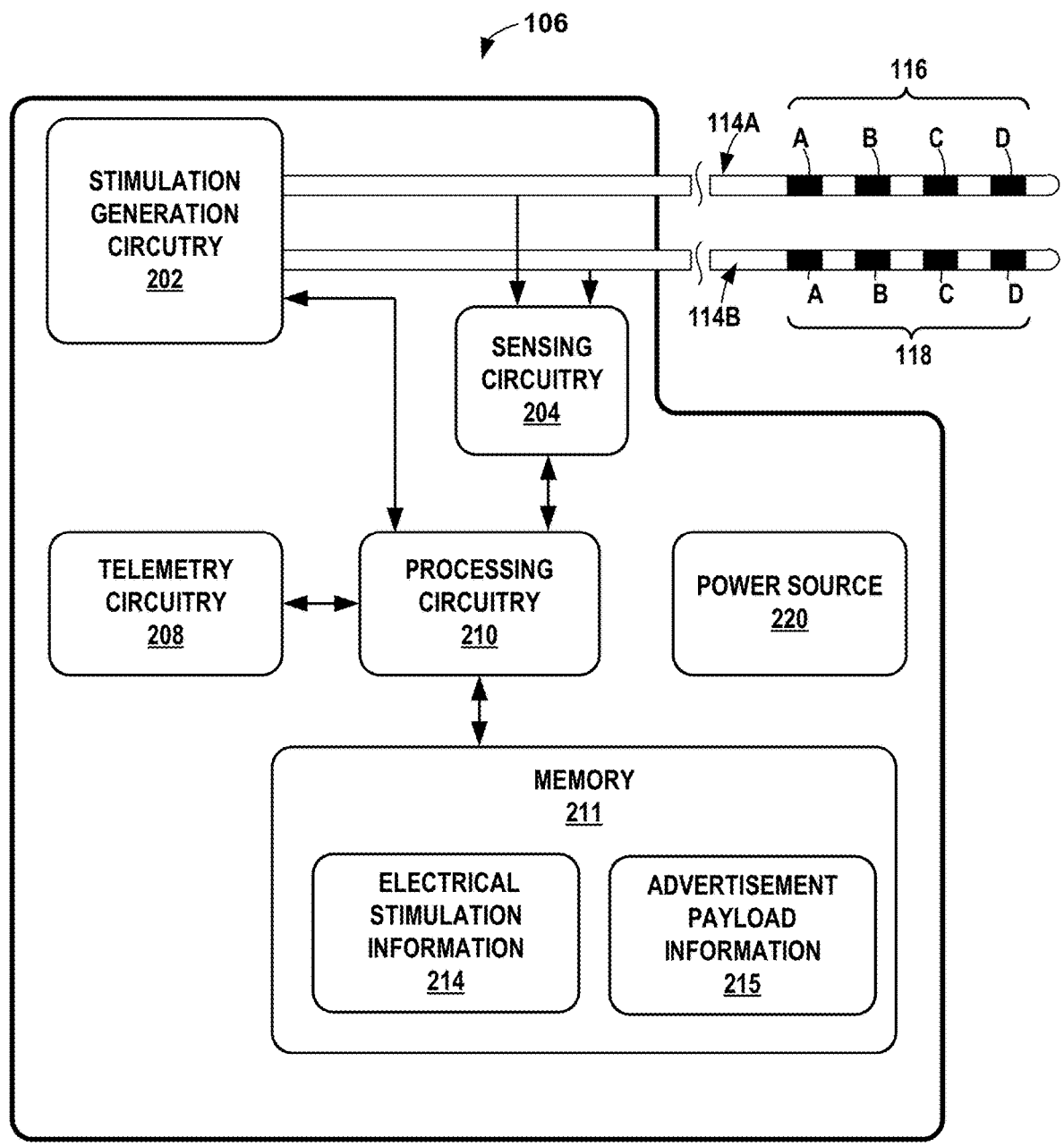
FIG. 2 is a block diagram of the example IMD of FIG. 1 for delivering electrical stimulation according to an example of the techniques of the disclosure.

FIG. 2 is a block diagram of the example IMD 106 of FIG. 1 for delivering stimulation therapy, such as adaptive deep brain stimulation therapy. In the example shown in FIG. 2, IMD 106 includes processing circuitry 210, memory 211, stimulation generation circuitry 202, sensing circuitry 204, and telemetry circuitry 208, and power source 220. Each of these circuits may be or include electrical circuitry configured to perform the functions attributed to each respective circuit. Memory 211 may include any volatile or non-volatile media, such as a random-access memory (RAM), read only memory (ROM), non-volatile RAM (NVRAM), ferroelectric RAM (FRAM), electrically erasable programmable ROM (EEPROM), flash memory, and the like. Memory 211 may store computer-readable instructions that, when executed by processing circuitry 210, cause IMD 106 to perform various functions. Memory 211 may be a storage device or other non-transitory medium.

In the example shown in FIG. 2, memory 211 stores electrical stimulation information 214. Electrical stimulation information 214 may include program parameters (e.g., a therapy parameter set), such as a stimulation electrode combination, electrode polarity, current or voltage amplitude, pulse width, and pulse rate. In some examples, individual therapy programs may be stored as a therapy group, which defines a set of therapy programs with which stimulation may be generated. The stimulation signals defined by the therapy programs of the therapy group may be delivered together on an overlapping or non-overlapping (e.g., time-interleaved) basis.

Accordingly, in some examples, stimulation generation circuitry 202 may generate electrical stimulation signals in accordance with the electrical stimulation parameters noted above, which may be examples of program parameters. Other ranges of therapy parameter values may also be useful, and may depend on the target stimulation site within patient 112. While stimulation pulses are described, stimulation signals may be of any form, such as continuous-time signals (e.g., sine waves) or the like.

Processing circuitry 210 may include fixed function processing circuitry and/or programmable processing circuitry, and may comprise, for example, any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processing circuitry 210 herein may be embodied as firmware, hardware, software or any combination thereof. Processing circuitry 210 may control stimulation generation circuitry 202 according to therapy programs 214 stored in memory 211 to apply particular stimulation parameter values specified by one or more of programs, such as voltage amplitude or current amplitude, pulse width, and/or pulse rate.

Advertisement payload information 215 may include one or more of a prioritizing bit for the instrument, a battery status, a change of therapy from last session with this programmer, a streaming status, a manufacturing all test passed, or a manufacturing: device production status as described in Table 1.

| Function | Flag | Size | Purpose | When set? | When cleared? |
|---|---|---|---|---|---|
| Prioritizing bit for the instrument | Set/Not Set | 3 bits | 3 bits - PP, CP, Recharger. A connecting instrument will see this information and can react accordingly<br>Data flow funnel can be adjusted depending on what is connected. Modality of connections can be altered depending on what data is available.<br>e.g., App knows not to connect to the INS when prioritization bit shows that INS is connected to the recharger | Set when a priority instrument opens session with INS | Cleared when the session is closed |
| Battery status | Low/High | 2 bits | | Set when battery level is less than 25%<br>Can be extended to more levels if needed with additional bits | Cleared when the device battery is recharged to or is above 25% |
| Change of therapy from last session with this programmer | Change/No Change | 2 bits | Can show/display the settings even before connecting completed<br>Faster response for user | Set when a change is made in a session | Cleared at close of a session when no change is made |
| Streaming status | On/Off | 1 bit | Connecting instrument shows different behavior while the INS is streaming | Set when INS starts streaming | Cleared when INS stops streaming |
| Manufacturing: All test passed | Yes/No | 1 bit | | | |
| Manufacturing: Device production status | Production/Development | 1 bit | | | |

In the example shown in FIG. 2, the set of electrodes 116 includes electrodes 116A, 1161B, 116C, and 116D, and the set of electrodes 118 includes electrodes 118A, 1181B, 118C, and 118D. Processing circuitry 210 may control individual voltage or current sources and sinks coupled to respective electrodes 116, 118, functioning as cathodes or anodes, to delivery stimulation signals to patient tissue. In other examples, processing circuitry may control switch circuitry to apply the stimulation signals generated by stimulation generation circuitry 202 to selected combinations of electrodes 116, 118.

Stimulation generation circuitry 202 may be a single channel or multi-channel stimulation generator. In particular, stimulation generation circuitry 202 may be capable of delivering a single stimulation pulse, multiple stimulation pulses, or a continuous signal at a given time via a single electrode combination or multiple stimulation pulses at a given time via multiple electrode combinations. For example, as mentioned above, stimulation generation circuitry 202 may comprise multiple voltage or current sources and sinks that are coupled to respective electrodes to drive the electrodes as cathodes or anodes simultaneously or at different times. In this example, IMD 106 may not require the functionality of switch circuitry for time-interleaved multiplexing of stimulation via different electrodes. In other examples, however, stimulation generation circuitry 202 may be configured to deliver multiple channels on a time-interleaved basis. For example, switch circuitry may serve to time divide the output of stimulation generation circuitry 202 across different electrode combinations at different times to deliver multiple programs or channels of stimulation energy to patient 112.

Telemetry circuitry 208 supports wireless communication (e.g., using Bluetooth™ Wi-Fi™, Near-Field Communication (NFC), Near Field Magnetic Induction (NFMI), Long Term Evolution, 5th generation (LTE/5G), or MedRadio (MICS: Medical Implant Communication Service, MEDS: Medical External Device Service, MBAD: Medical Body Area Network)) between IMD 106 and an external device 104 or another computing device under the control of processing circuitry 210. In some examples, telemetry circuitry 208 supports a telemetry frequency that may correspond to a high frequency or radio frequency, which may be a radio frequency established via Bluetooth, Wi-Fi, Near-Field Communication (NFC), 175 KHz inductive telemetry, or MICS, for example. Telemetry circuitry 208 may be configured to receive an inductive sting. Processing circuitry 210 of IMD 106 may receive, as updates to programs (e.g., at least one program parameter), values for various stimulation parameters such as magnitude and electrode combination, from external device 104 via telemetry circuitry 208. The updates to the therapy programs may be stored within therapy programs 214 portion of memory 211. Telemetry circuitry 208 in IMD 106, as well as telemetry modules in other devices and systems described herein, such as external device 104, may accomplish communication by radiofrequency (RF) communication techniques (e.g., Bluetooth, Wi-Fi, Near-Field Communication (NFC), or MICS). In addition, telemetry circuitry 208 may communicate with external medical device external device 104 via proximal inductive interaction of IMD 106 with external device 104. Accordingly, telemetry circuitry 208 may send information to external device 104 on a continuous basis, at periodic intervals, or upon request from IMD 106 or external device 104.

Telemetry circuitry 208 may periodically output an advertisement for a connection at an advertising interval (e.g., less than 100 ms, 100 ms to 500 ms, 1 second, more than 1 second, etc.) with an optional random delay. The advertisement may include information on how to connect with the advertising device, such as, for example, one or more of: (1) media access control (MAC) addresses for the medical device and external device; (2) a real time-point in time for the transfer to start; (3) an indication of a starting frequency; (4) an indication of a hop set; (5) a connection interval; or (6) a connection latency. In some examples, telemetry circuitry 208 may receive the advertisement and connect with another device (e.g., external device 104) using the received advertisement (e.g., using a starting frequency and hop set of the received advertising packet).

Power source 220 delivers operating power to various components of IMD 106. Power source 220 may include a small rechargeable or non-rechargeable battery and a power generation circuit to produce the operating power. Recharging may be accomplished through proximal inductive interaction between an external charger and an inductive charging coil within IMD 106. In some examples, power requirements may be small enough to allow IMD 106 to utilize patient motion and implement a kinetic energy-scavenging device to trickle charge a rechargeable battery. In other examples, traditional batteries may be used for a limited period of time.

Processing circuitry 210 of IMD 106 may sense, via electrodes 116, 118 interposed along leads 114 (and sensing circuitry 204), one or more bioelectric signals of brain 120 of patient 112. Further, processing circuitry 210 of IMD 106 may deliver, via electrodes 116, 118 (and stimulation generation circuitry 202), electrical stimulation therapy to patient 112 based on the sensed one or more bioelectric signals of brain 120. The adaptive DBS therapy is defined by electrical stimulation information 214. For example, electrical stimulation information 214 may include a current amplitude (for a current-controlled system) or a voltage amplitude (for a voltage-controlled system), a pulse rate or frequency, and a pulse width, or a number of pulses per cycle. In examples where the electrical stimulation is delivered according to a "burst" of pulses, or a series of electrical pulses defined by an "on-time" and an "off-time," the one or more parameters may further define one or more of a number of pulses per burst, an on-time, and an off-time. Processing circuitry 210, via electrodes 116, 118, delivers to patient 112 adaptive DBS and may adjust one or more parameters defining the electrical stimulation based on corresponding parameters of the sensed one or more bioelectric signals of brain 120.

In some examples, processing circuitry 210 may continuously measure the one or more bioelectric signals in real time. In other examples, processing circuitry 210 may periodically sample the one or more bioelectric signals according to a predetermined frequency or after a predetermined amount of time. In some examples, processing circuitry 210 may periodically sample the signal at a frequency of approximately 150 Hertz.

Telemetry circuitry 208 may be configured to output an advertisement, such as, an advertisement for a wireless communication session or advertisement compliant with another protocol. For example, telemetry circuitry 208 may output the advertisement at an advertising interval. The advertising interval may include a Bluetooth Low Energy advertising interval. Telemetry circuitry 208 may ping external device 104. For example, telemetry circuitry 208 may output an advertisement or advertisement package that external device 104 or another device listens for in order to know if there is a device for exchanging communications. In some examples, the telemetry circuitry 208 may output the advertisement in response to a sting and/or may periodically output the advertisement using an advertising interval (e.g., with a random delay). As the advertisements take energy, telemetry circuitry 208 may benefit from sending advertisements in longer intervals. The advertisement may comprise security information for a communication session and/or connection information for the communication session.

In accordance with the techniques of the disclosure, processing circuitry 210 may be configured to change an advertisement (e.g., a Bluetooth™ advertisement or another advertisement) of the medical device (e.g., an implanted medical device) to include a payload. For example, processing circuitry 210 may configure the advertisement output by telemetry circuitry 208 to include a payload that indicates a battery level (e.g., a voltage or charge level) at power source 220. In some examples, processing circuitry 210 may configure the advertisement output by telemetry circuitry 208 to include a payload that provides an indication of whether telemetry circuitry 208 has established a communication session that remains in operation.

For example, processing circuitry 210 may identify a device that has established the communication session that remains open. In this example, processing circuitry 210 may use advertisement payload information 215 to match the device to a prioritizing bit assigned to a device. In this example, processing circuitry 210 may configure the advertisement output by telemetry circuitry 208 to include a payload that provides an indication of the prioritizing bit assigned to the device. External device 104 may initiate and/or establish a connection with the device identified using the prioritizing bit to request information from IMD 106. In this way, IMD 106 may initiate and/or establish fewer communication sessions, which may help to save energy stored by IMD 106, while also allowing the information to be provided using an existing communication session, which may reduce a delay in the information being provided to patient 112 or a caretaker of patient 112. Saving energy may help to optimize telemetry performance and/or efficiency, which can help make the last longer.

In accordance with the techniques of the disclosure, IMD 106 may implement smart connectivity driving optimized longevity of power source 220 (e.g., a battery) and an optimized individual tailor-made user experience that reduces or even eliminates a connection latency of telemetry circuitry 208. Techniques described herein may help to allow IMD 106 to function to optimum performance levels exceling in patient experience while improving device longevity. Techniques described herein may help to allow patient 122 to use IMD 106 for a longer time, therefore reducing the risk of replacement surgeries.

Figure 3:
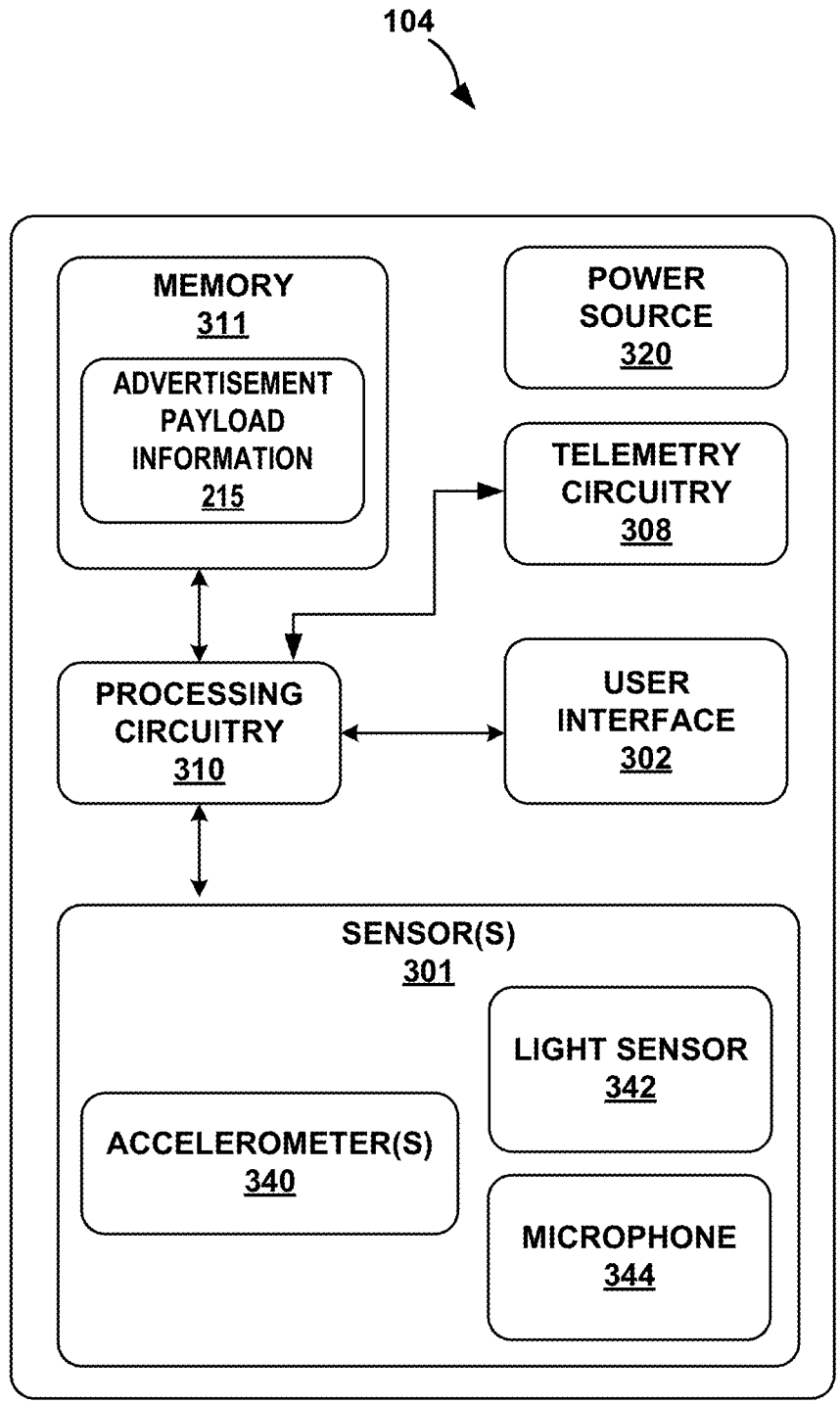
FIG. 3 is a block diagram of the external device of FIG. 1 for communicating with a medical device according to an example of the techniques of the disclosure.

FIG. 3 is a block diagram of the external device 104 of FIG. 1. Although external device 104 may generally be described as a hand-held device, external device 104 may be a larger portable device or a more stationary device. In addition, in other examples, external device 104 may be included as part of an external charging device or include the functionality of an external charging device. As illustrated in FIG. 3, external device 104 may include processing circuitry 310, memory 311, user interface 302, telemetry circuitry 308, and power source 320. Memory 311 may store instructions that, when executed by processing circuitry 310, cause processing circuitry 310 and external device 104 to provide the functionality ascribed to external device 104 throughout this disclosure. Each of these components, or modules, may include electrical circuitry that is configured to perform some or all of the functionality described herein. For example, processing circuitry 310 may include processing circuitry configured to perform the processes discussed with respect to processing circuitry.

In general, external device 104 comprises any suitable arrangement of hardware, alone or in combination with software and/or firmware, to perform the techniques attributed to external device 104, and processing circuitry 310, user interface 302, and telemetry circuitry 208 of IMD 106. In various examples, external device 104 may include one or more processors, which may include fixed function processing circuitry and/or programmable processing circuitry, as formed by, for example, one or more microprocessors, DSPs, ASICs, FPGAs, or any other equivalent integrated or discrete logic circuitry, as well as any combinations of such components. External device 104 also, in various examples, may include a memory 311, such as RAM, ROM, PROM, EPROM, EEPROM, flash memory, a hard disk, a CD-ROM, comprising executable instructions for causing the one or more processors to perform the actions attributed to them. Moreover, although processing circuitry 310 and telemetry circuitry 308 are described as separate modules, in some examples, processing circuitry 310 and telemetry circuitry 308 may be functionally integrated with one another. In some examples, processing circuitry 310 and telemetry circuitry 308 correspond to individual hardware units, such as ASICs, DSPs, FPGAs, or other hardware units. While telemetry circuitry 308 is described as being arranged within external device 104, in some examples, aspects of telemetry circuitry 308 (e.g., configuring a medical device to advertise at an advertising interval or initiating a communication session) may be performed by telemetry circuitry 308 external to external device 104 (e.g., in an intermediate device).

Memory 311 (e.g., a storage device) may store instructions that, when executed by processing circuitry 310, cause processing circuitry 310 and external device 104 to provide the functionality ascribed to external device 104 throughout this disclosure. For example, memory 311 may include instructions that cause processing circuitry 310 to obtain a parameter set from memory or receive a user input and send a corresponding command to IMD 106, or instructions for any other functionality. In addition, memory 311 may include a plurality of programs, where each program includes a parameter set that defines stimulation therapy.

User interface 302 may include a button or keypad, lights, a speaker for voice commands, a display, such as a liquid crystal (LCD), light-emitting diode (LED), or organic light-emitting diode (OLED). In some examples the display may be a touch screen. User interface 302 may be configured to display any information related to the delivery of stimulation therapy, identified patient behaviors, sensed patient parameter values, patient behavior criteria, or any other such information. User interface 302 may also receive user input. The input may be, for example, in the form of pressing a button on a keypad or selecting an icon from a touch screen.

One or more sensors 301 may include one or more accelerometers 340, a light sensor 342, and a microphone 344. For example, one or more accelerometers 340 may be configured to determine information indicating a movement of external device 104. Information may comprise one or more of an acceleration in an x-direction, acceleration in a y-direction, or an acceleration in a z-direction. The x-direction may be perpendicular to both the y-direction and the z-direction. While the example of FIG. 3 uses accelerometer 340, in some examples external device 104 may additionally, or alternatively, include a gyroscope that may detect the movement and/or generate motion information. Light sensor 342 may be configured to determine light information (e.g., an ambient light level of an environment detected by light sensor 342). Microphone 344 may be configured to determine sound information (e.g., an ambient sound level of an environment detected by microphone 344). For example, microphone 344 may detect speech (e.g., from patient 122 or a caretaker of patient 122).

Telemetry circuitry 308 may support wireless communication between IMD 106 and external device 104 under the control of processing circuitry 310. Telemetry circuitry 308 may also be configured to communicate with another computing device via wireless communication techniques, or direct communication through a wired connection. In some examples, telemetry circuitry 308 provides wireless communication via an RF or proximal inductive medium. In some examples, telemetry circuitry 308 includes an antenna, which may take on a variety of forms, such as an internal or external antenna.

Examples of local wireless communication techniques that may be employed to facilitate communication between external device 104 and IMD 106 include RF communication according to the 802.11 or Bluetooth specification sets (e.g., Classic Bluetooth, Bluetooth high speed and Bluetooth Low Energy (BLE) protocols) or other standard or proprietary telemetry protocols. In this manner, other external devices may be capable of communicating with external device 104 without needing to establish a secure wireless connection. While examples described herein may refer to connections as using the Bluetooth protocol for establishing a connection and using advertisements compliant with the Bluetooth protocol other known and future protocols may be used. For example, techniques described herein for establishing a connection between IMD 106 and external device 104 may be compliant with any RF communication protocol and/or may use any telemetry frequency.

Telemetry circuitry 308 may receive the advertisement and connect with another device (e.g., IMD 106) using the received advertisement. The advertisement may include information on how to connect with the advertising device, such as, for example, one or more of: (1) media access control (MAC) addresses for the medical device and external device; (2) a real time-point in time for the transfer to start; (3) an indication of a starting frequency; (4) an indication of a hop set; (5) a connection interval; or (6) a connection latency. For example, telemetry circuitry 308 may establish a connection with medical device 106 using a starting frequency and hop set indicated by an advertisement broadcast (e.g., on a set of advertising channels) by medical device 106. In some examples, telemetry circuitry 308 may periodically output an advertisement at an advertising interval (e.g., less than 100 ms, 100 ms to 500 ms, 1 second, more than 1 second, etc.) with an optional random delay. In this example, other devices may connect with telemetry circuitry 308 using the advertisement output by telemetry circuitry 308.

In some examples, processing circuitry 310 may define the parameters of electrical stimulation therapy, stored in memory 311, for delivering adaptive DBS to patient 112. In one example, processing circuitry 310 of external device 104, via telemetry circuitry 308, issues commands to IMD 106 causing IMD 106 to deliver electrical stimulation therapy via electrodes 116, 118 via leads 114.

Telemetry circuitry 308 may be configured to initiate a communication session using an advertisement. For example, telemetry circuitry 308 may receive (e.g., from telemetry circuitry 208) the advertisement at an advertising interval. The advertising interval may include a Bluetooth Low Energy advertising interval. The advertisement may comprise security information for a communication session and/or connection information for the communication session. For example, telemetry circuitry 308 may establish a communication session using security information for a communication session and/or connection information for the communication session advertised by IMD 106 at an advertising interval.

In accordance with the techniques of the disclosure, processing circuitry 310 may be configured to use a payload of an advertisement (e.g., a Bluetooth™ advertisement or another advertisement) itself and/or to use the payload to identify another device to initiate a communication session with for determining information from IMD 106. For example, processing circuitry 310 may receive the advertisement output by telemetry circuitry 208 to include a payload that indicates a battery level (e.g., a voltage or charge level) at power source 220. In this example, processing circuitry 310, which may be configured to request a battery level at power source 220, may refrain from establishing a communication session with IMD 106 and instead use the battery level included in the payload of the advertisement as responsive to a request for a battery level.

In some examples, processing circuitry 310 may receive the advertisement output by telemetry circuitry 208 to include a payload that provides an indication of whether telemetry circuitry 208 has established a communication session that remains in operation. In this example, processing circuitry 310 may identify a device that has established the communication session with IMD 106 using advertisement payload information 315. Advertisement payload information 315 may include one or more of a prioritizing bit for the instrument, a battery status, a change of therapy from last session with this programmer, a streaming status, a manufacturing all test passed, or a manufacturing: device production status as described in Table 1.

For example, processing circuitry 310 may determine a prioritizing bit from the payload. In this example, processing circuitry 310 may match the prioritizing bit included in the payload of the advertisement with a prioritizing bit of advertisement payload information 315. In this example, processing circuitry 310 may determine a device that advertisement payload information 315 assigns to the matched prioritizing bit. Processing circuitry 310, with telemetry circuitry 308, may initiate and/or establish a connection with the device identified using the prioritizing bit to request information from IMD 106. For example, processing circuitry 310, with telemetry circuitry 308, may output an advertisement to initiate a communication session with the device identified using the prioritizing bit. In some examples, processing circuitry 310, with telemetry circuitry 308, may receive an advertisement from the device identified using the prioritizing bit and establish a communication session with the device identified using the prioritizing bit according to the advertisement from the device identified using the prioritizing bit. Because the advertisement interval of the device identified using the prioritizing bit (e.g., a clinician programmer or a patient programmer) may be shorter (e.g., less than 100 ms) compared to the advertisement interval of IMD 106 (e.g., more than 1 second), processing circuitry 310 may more quickly request information and receive information responsive to the request using both the communication session between external device 104 and the device and the communication session between the device and IMD 106. In this way, external device 104 may implement smart connectivity driving optimized longevity of a battery of IMD 106 and an optimized individual tailor-made user experience that reduces a connection latency. Techniques described herein may help to allow IMD 106 to function to optimum performance levels exceling in patient experience while improving device longevity. Techniques described herein may help to allow patient 102 to use IMD 106 for a longer time, therefore reducing the risk of replacement surgeries.

Figure 4:
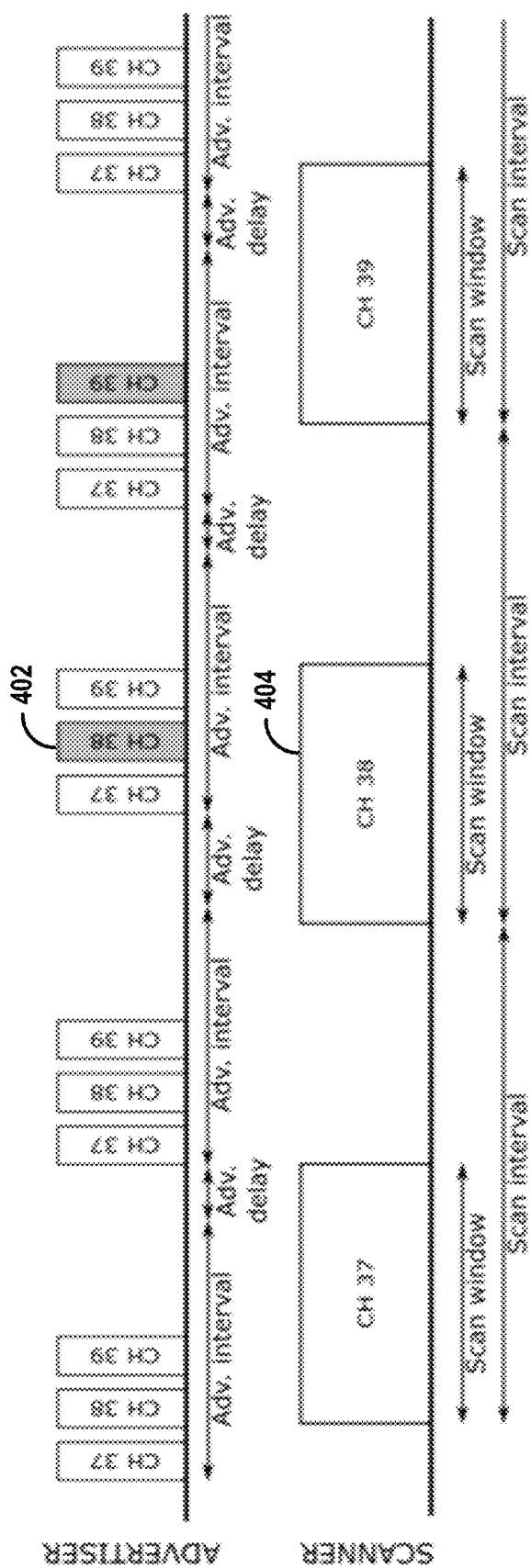
FIG. 4 is a conceptual diagram of an advertisement according to an example of the techniques of the disclosure.

FIG. 4 is a conceptual diagram of an advertisement according to an example of the techniques of the disclosure. The abscissa axis of FIG. 4 represents time and the ordinate axis of FIG. 4 represents a channel advertised by an advertiser and a channel scanned by a scanner. In the example of FIG. 4, a peripheral device advertises and a central device scans. The advertising interval may help to determine a battery consumption on peripheral and may help to determine how fast and/or slow a connection is made. In some examples, IMD 106 may represent a peripheral device that outputs advertisement 402 (e.g., on channel 38) and external device 104 may represent a central device that scans a channel 404 (e.g., channel 38). Techniques described herein for configuring an advertisement to include a payload may help to optimize a user experience while keeping nominal advertising as slow as possible. In the example of FIG. 4, external device 104 may not detect the advertisement from IMD 106 until scanning 404 while IMD 106 outputs advertisement 402, which may take multiple advertisement intervals.

Figure 5:
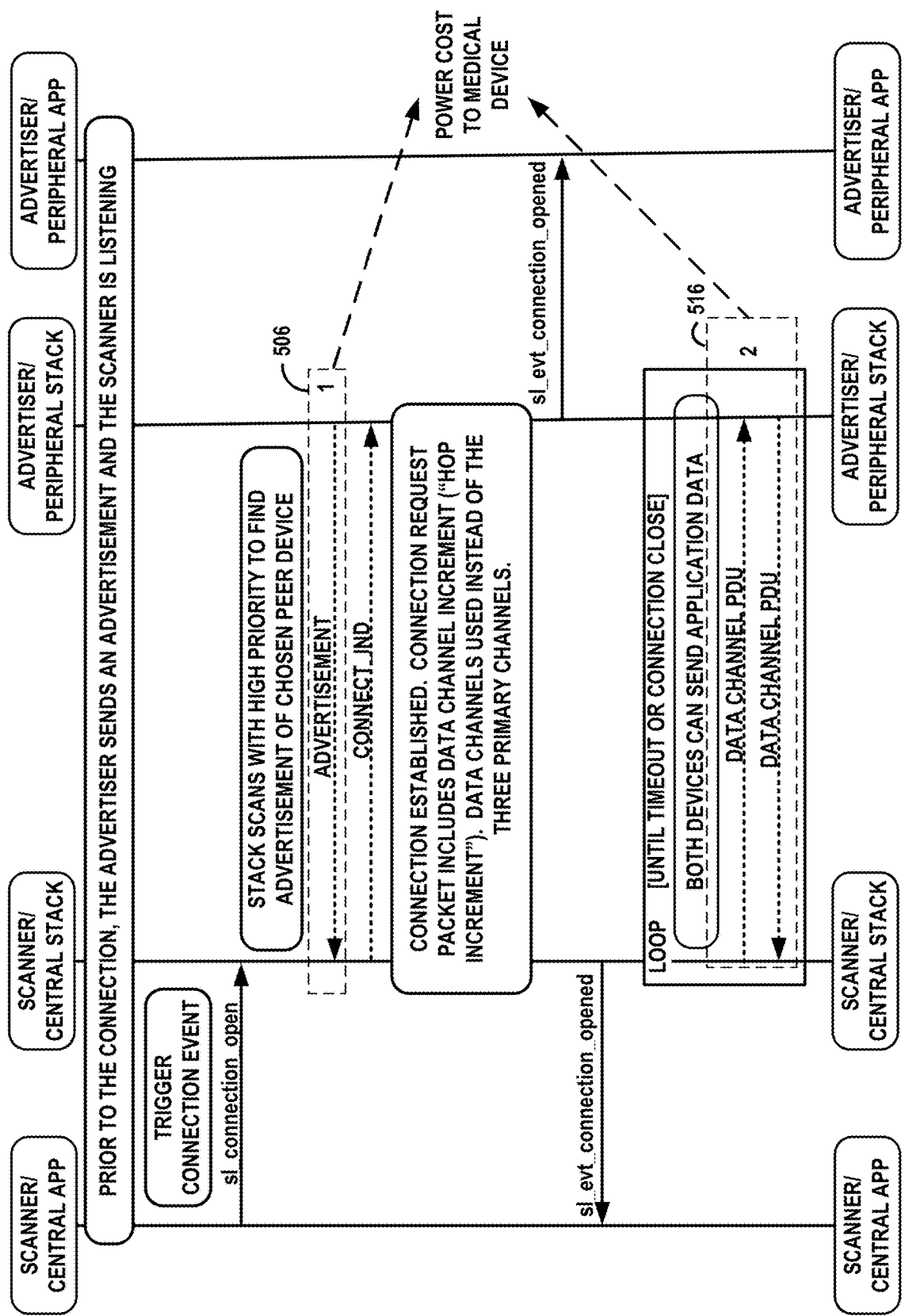
FIG. 5 is a conceptual diagram of a process of sending a payload using an established connection according to an example of the techniques of the disclosure.

FIG. 5 is a conceptual diagram of a process of sending a payload using an established connection according to an example of the techniques of the disclosure. In some examples, IMD 106 may represent the advertiser and external device 104 may represent the scanner. In the example of FIG. 5, IMD 106 may output an advertisement 506. In this example, external device 104 may detect the advertisement within a scan window. After establishing the communication session (after CONNECT_IND), IMD 106 and external device 104 may use the data channel increment (e.g., "hop increment) to exchange information 516 and the communication session may be closed. In this example, IMD 106 may use a significant amount of power to perform the advertisement 506 and the exchange information 516.

Figure 6:
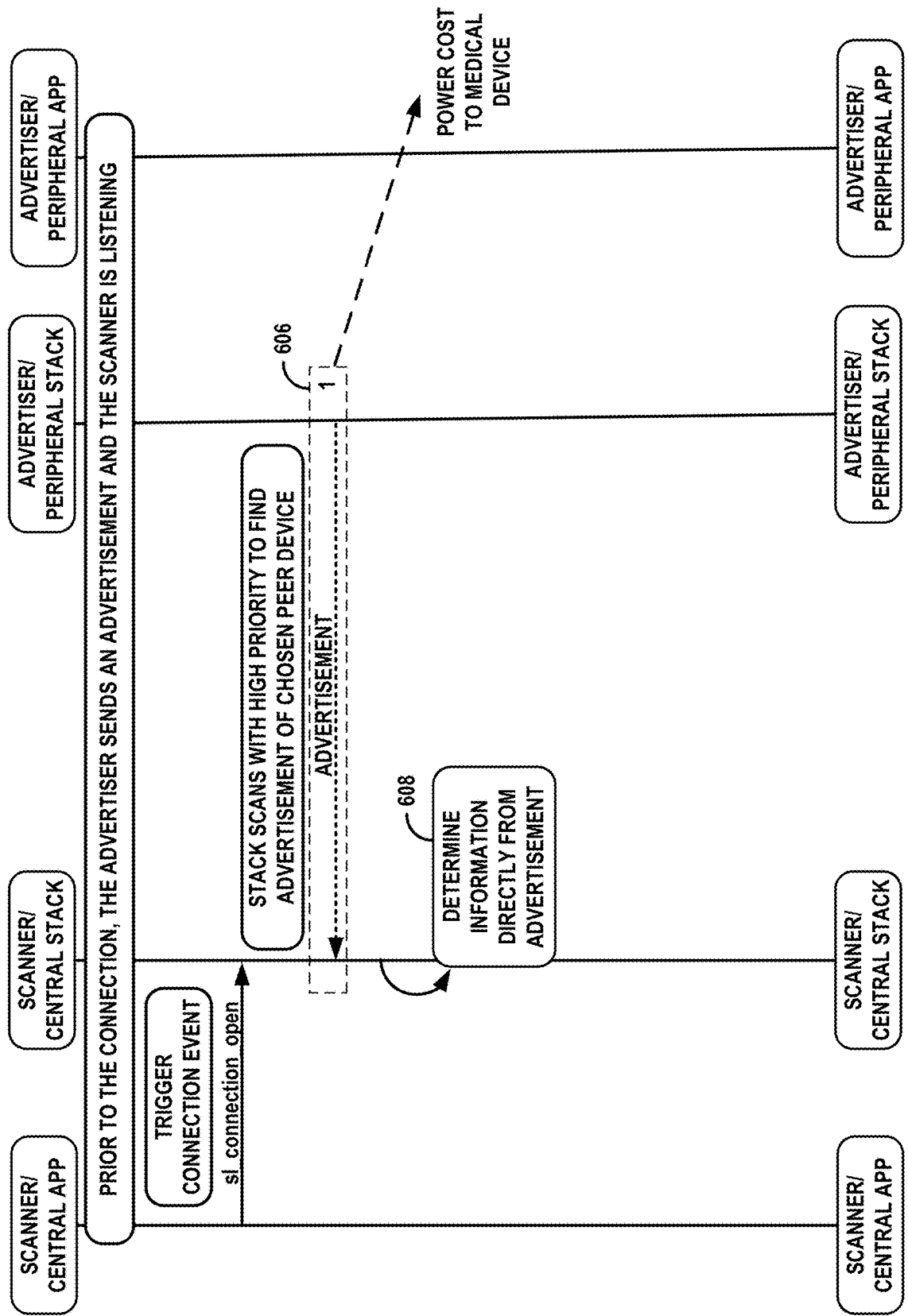
FIG. 6 is a conceptual diagram of a process of sending a payload included in an advertisement according to an example of the techniques of the disclosure.

FIG. 6 is a conceptual diagram of a process of sending a payload included in an advertisement according to an example of the techniques of the disclosure. In some examples, IMD 106 may represent the advertiser and external device 104 may represent the scanner. In the example of FIG. 6, IMD 106 may output an advertisement 606. For some use scenarios, adequate information can be relayed through the advertising payload of the advertisement and the response can be achieved without initiating a session with IMD 106. For example, external device 104 may determine information (e.g., a battery level at IMD 106) directly from the advertisement (608). In this way, external device 104 and IMD 106 may skip establishing the communication session (CONNECT_IND), and exchanging information (e.g., step 516 of FIG. 5), which may help to save energy stored by IMD 106, while also allowing the information to be provided using an existing communication session, which may reduce a delay in the information being provided to patient 112 or a caretaker of patient 112. Saving energy may help to optimize telemetry performance and/or efficiency, which can help make the last longer.

Figure 7:
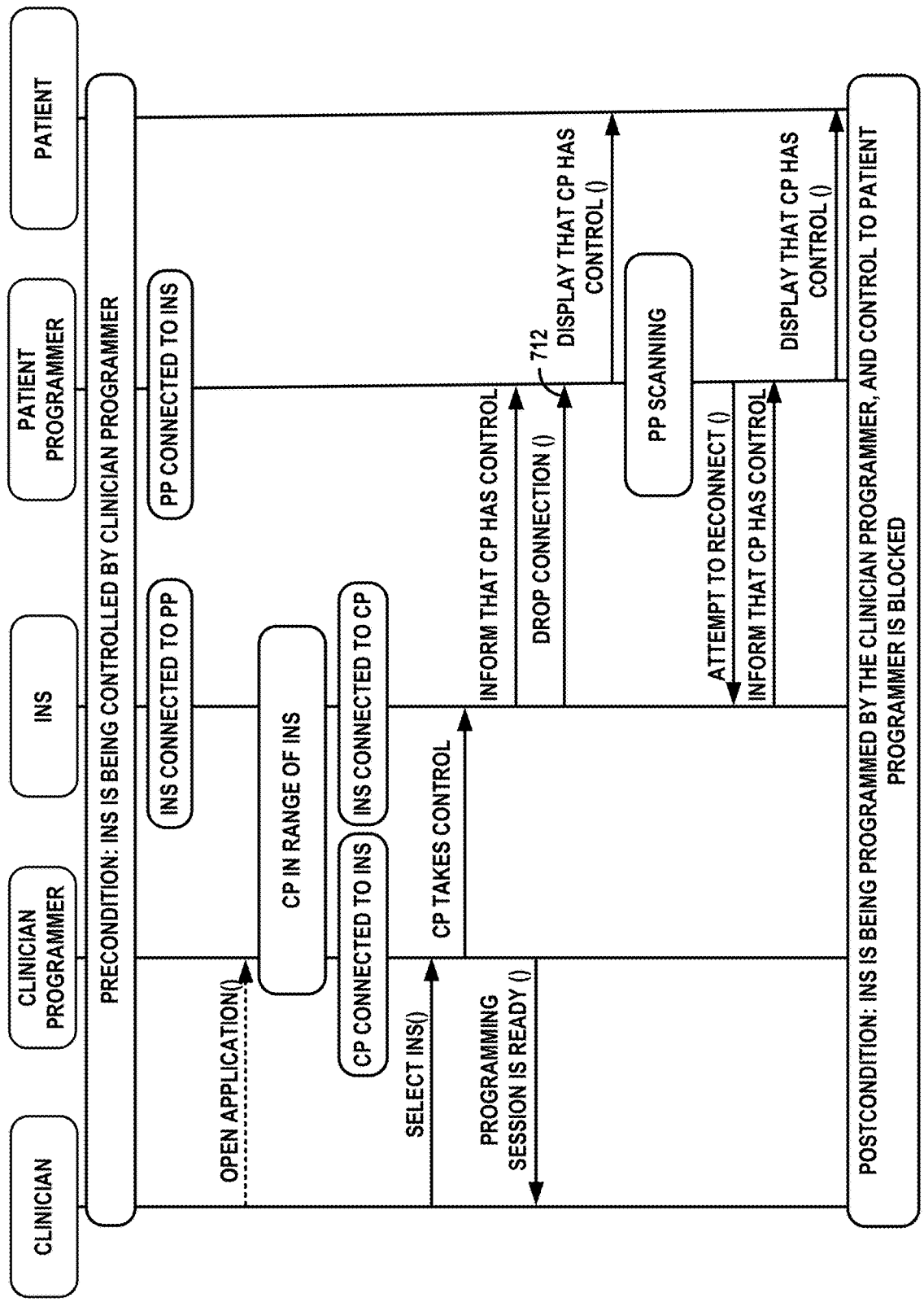
FIG. 7 is a conceptual diagram of controlling an IMD using an instrument prioritizing bit according to an example of the techniques of the disclosure.

FIG. 7 is a conceptual diagram of controlling IMD 106 using an instrument prioritizing bit according to an example of the techniques of the disclosure. In some examples, the INS of FIG. 7 may represent IMD 106. In the example of FIG. 7, a precondition is that the INS is being controlled by a clinician programmer. In response to an initiation of a communication session from both the patient programmer (PP) and the clinician programmer (CP), the INS may drop the connection with the PP (712). For example, the INS may use an instrument flag in advertising payload. Because the CP, in this example, has higher priority than PP, the CP is allowed to take over communication, but PP is not allowed to take over communication.

Figure 8:
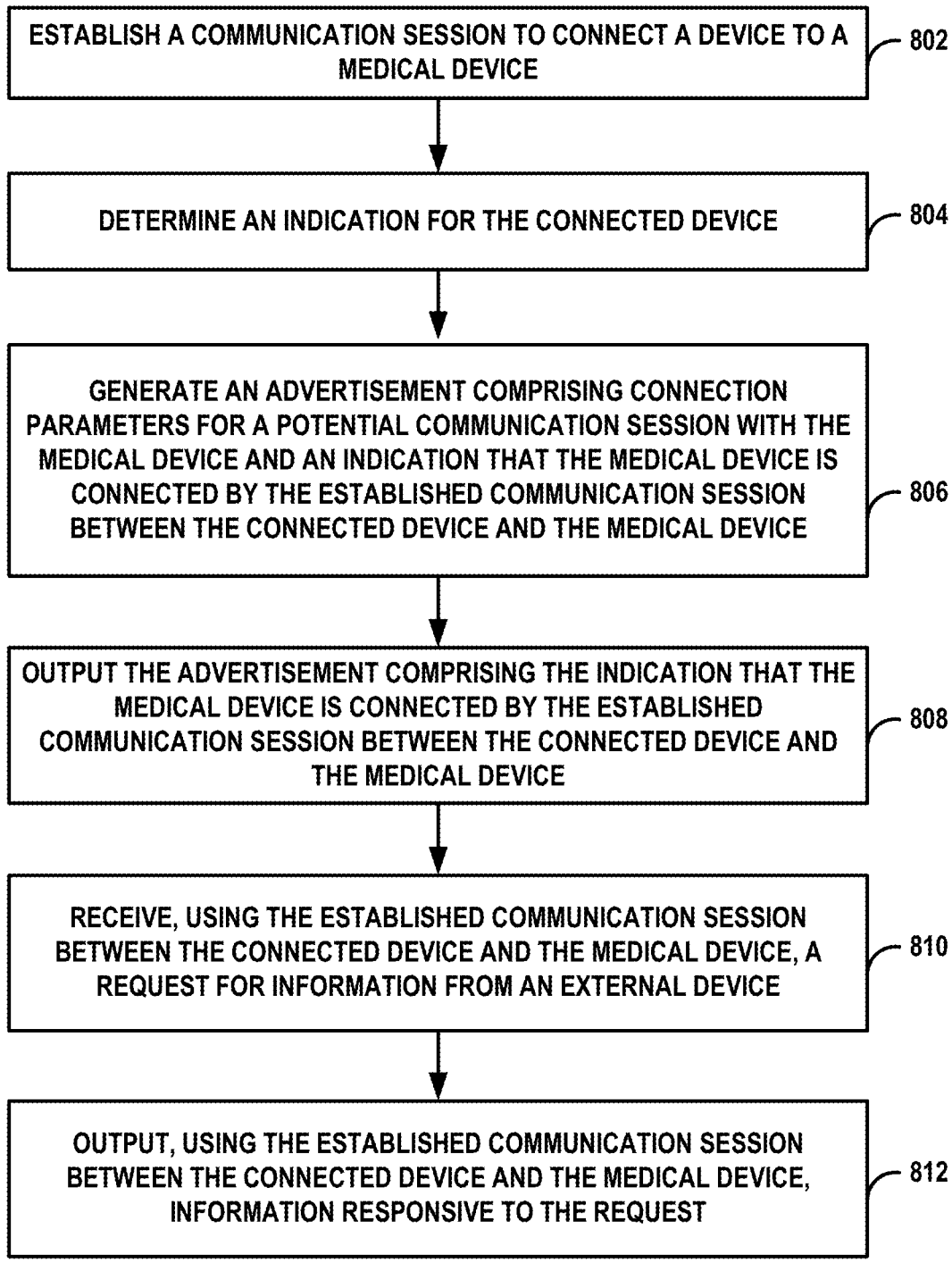
FIG. 8 is a flowchart illustrating an example operation of a medical device configured to generate an advertisement with a payload according to an example of the techniques of the disclosure.

FIG. 8 is a flowchart illustrating an example operation of a medical device configured to generate an advertisement with a payload according to an example of the techniques of the disclosure. FIG. 8 is discussed with FIGS. 1-7 for example purposes only. Processing circuitry 210 may establish, with telemetry circuitry 208, a communication session to connect a device to the medical device (802). For example, processing circuitry 210 may output, with telemetry circuitry 208, a second advertisement indicating connection parameters telemetry circuitry 208. In this example, the connected device is configured to establish the communication session between the medical device and the connected device using the connection parameters of the second advertisement.

The connected device may comprise for example, a clinician programmer, a patient programmer, a recharger device, or a mobile device. The medical device may comprise an implantable medical device (e.g., IMD 106). The medical device may be configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS). Processing circuitry 210 may determine an indication for the connected device (804). For example, processing circuitry 210 may determine a prioritizing bit assigned to the connected device (e.g., using table 1 and/or advertisement payload information 215).

Processing circuitry 210 may generate an advertisement comprising connection parameters for a potential communication session with the medical device and an indication that the medical device is connected by the established communication session between the connected device and the medical device (806). Processing circuitry 210 may output, with telemetry circuitry 208, the advertisement comprising the indication that the medical device is connected by the established communication session between the connected device and the medical device (808). The advertisement may comprises a Bluetooth low energy advertisement.

Processing circuitry 210 may receive, with telemetry circuitry 208 and using the established communication session between the connected device and the medical device, a request for information from the external device (810). Processing circuitry 210 may output, with telemetry circuitry 208 and using the established communication session between the connected device and the medical device, information responsive to the request (812).

Figure 9:
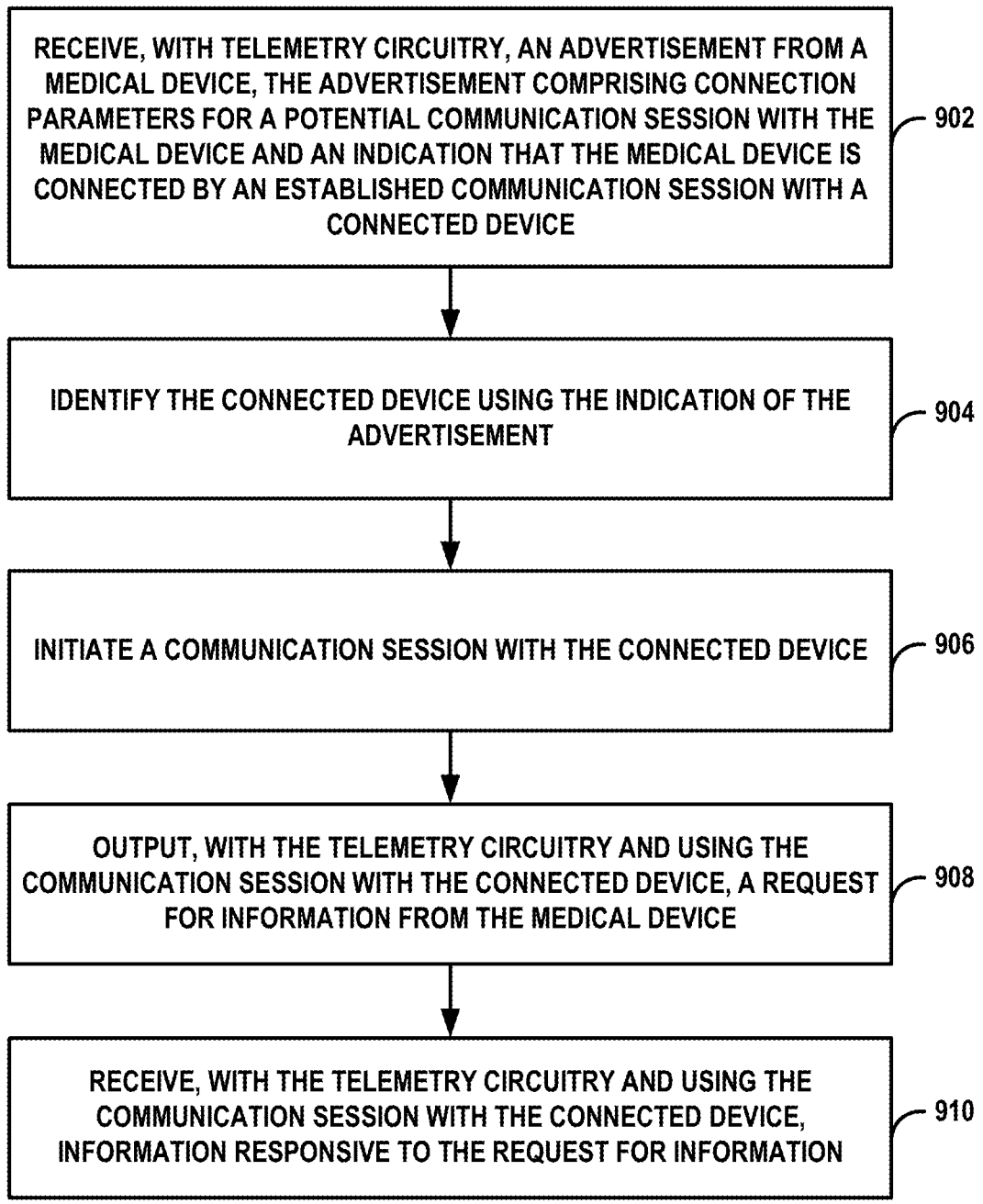
FIG. 9 is a flowchart illustrating an example operation of an external programmer configured to use an advertisement with a payload according to an example of the techniques of the disclosure.

FIG. 9 is a flowchart illustrating an example operation of an external programmer configured to use an advertisement with a payload according to an example of the techniques of the disclosure. FIG. 9 is discussed with FIGS. 1-8 for example purposes only. Processing circuitry 310 may receive, with telemetry circuitry 308, an advertisement from the medical device, the advertisement comprising connection parameters for a potential communication session with the medical device and an indication that the medical device is connected by an established communication session with a connected device (902). In some examples, telemetry circuitry 308 may be arranged in external device 104. However, in some examples telemetry circuitry 308 may be arranged outside external device 104.

The connected device may comprise for example, a clinician programmer, a patient programmer, a recharger device, a programmer fob, or a mobile device. The medical device may comprise an implantable medical device (e.g., IMD 106). The medical device may be configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS). The advertisement may comprises a Bluetooth low energy advertisement.

Processing circuitry 310 may identify the connected device using the indication of the advertisement (904). For example, processing circuitry 310 may match the indication of the advertisement with a prioritizing bit assigned to the connected device (e.g., using Table 1 and/or advertisement payload information 315).

Processing circuitry 310 may initiate a communication session with the connected device (906). For example, processing circuitry 310 may receive, with telemetry circuitry 308, a second advertisement indicating connection parameters for the communication session with the connected device. In this example, processing circuitry 310 may establish, with telemetry circuitry 308, the communication session between the medical device and the connected device using the second advertisement. The connected device may be configured to output the second advertisement at an advertisement interval that is less than an advertisement interval of the first advertisement. In some examples, processing circuitry 310 may output, with telemetry circuitry 308, a second advertisement indicating connection parameters for the communication session with telemetry circuitry 308. In this example, the connected device may establish, with telemetry circuitry 308, the communication session between the medical device and the connected device using the second advertisement. Processing circuitry 310, with telemetry circuitry 308, may be configured to output the second advertisement at an advertisement interval that is less than an advertisement interval of the first advertisement.

Processing circuitry 310 may output, with telemetry circuitry 308 and using the communication session with the connected device, a request for information from the medical device (908). Processing circuitry 310 may receive, with telemetry circuitry 308 and using the communication session with the connected device, information responsive to the request for information (910). For example, the connected device may be configured to output, using the established communication session between the medical device and the connected device, the request to the medical device. In this example, the connected device may receive, using the established communication session between the medical device and the connected device, the information and output, using the communication session between telemetry circuitry 308 and the connected device, the information to telemetry circuitry 308.

The following clauses are a non-limiting list of examples in accordance with one or more techniques of this disclosure.

Clause 1: A system comprising: telemetry circuitry configured for communication between a medical device and an external device associated with the medical device; and processing circuitry configured to: receive, with the telemetry circuitry, an advertisement from the medical device, the advertisement comprising connection parameters for a potential communication session with the medical device and an indication that the medical device is connected by an established communication session between the medical device and a connected device; identify the connected device using the indication of the advertisement; initiate a communication session between the telemetry circuitry and the connected device; and output, with the telemetry circuitry and using the communication session between the telemetry circuitry and the connected device, a request for information from the medical device.

Clause 2: The system of clause 1, wherein the advertisement is a first advertisement and wherein, to initiate a communication session between the telemetry circuitry and the connected device, the processing circuitry is further configured to: receive, with the telemetry circuitry, a second advertisement indicating connection parameters for the communication session with the connected device; establish, with the telemetry circuitry, the communication session with the connected device using the second advertisement.

Clause 3: The system of clause 2, wherein the connected device is configured to output the second advertisement at an advertisement interval that is less than an advertisement interval of the first advertisement.

Clause 4: The system of any of clauses 1-3, wherein the processing circuitry is further configured to receive, with the telemetry circuitry and using the communication session with the connected device, information responsive to the request for information.

Clause 5: The system of clause 4, wherein the connected device is configured to: output, using the established communication session between the medical device and the connected device, the request to the medical device; receive, using the established communication session between the medical device and the connected device, the information; and output, using the communication session between the telemetry circuitry and the connected device, the information to the telemetry circuitry.

Clause 6: The system of any of clauses 1-5, wherein, to identify the connected device using the indication of the advertisement, the processing circuitry is further configured to match the indication of the advertisement with a prioritizing bit assigned to the connected device.

Clause 7: The system of any of clauses 1-6, wherein the connected device comprises a clinician programmer.

Clause 8: The system of any of clauses 1-6, wherein the connected device comprises a patient programmer.

Clause 9: The system of any of clauses 1-6, wherein the connected device comprises a recharger device.

Clause 10: The system of any of clauses 1-6, wherein the external device comprises a mobile device.

Clause 11: The system of any of clauses 1-10, wherein the advertisement comprises a Bluetooth low energy advertisement.

Clause 12: The system of any of clauses 1-11, wherein the medical device comprises an implantable medical device.

Clause 13: The system of any of clauses 1-12, wherein the telemetry circuitry and the processing circuitry are arranged in the external device.

Clause 14: The system of clauses 1-12, wherein the processing circuitry is arranged in the external device and the telemetry circuitry is arranged outside of the external device.

Clause 15: The system of clauses 1-14, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 16: A method comprising: receiving, by processing circuitry, an advertisement from a medical device, the advertisement comprising connection parameters for a potential communication session with the medical device and an indication that the medical device is connected by an established communication session with a connected device; identifying, by the processing circuitry, the connected device using the indication of the advertisement; initiating, by the processing circuitry, a communication session with the connected device; and outputting, by the processing circuitry and using the communication session with the connected device, a request for information from the medical device.

Clause 17: A computer-readable storage medium having stored thereon instructions that, when executed, cause processing circuitry to: receive an advertisement from a medical device, the advertisement comprising connection parameters for a potential communication session with the medical device and an indication that the medical device is connected by an established communication session with a connected device; identify the connected device using the indication of the advertisement; initiate a communication session with the connected device; and output, using the communication session with the connected device, a request for information from the medical device.

Clause 18: A medical device comprising: telemetry circuitry configured for communication between the medical device and an external device associated with the medical device; and processing circuitry configured to: establish, with the telemetry circuitry, a communication session to connect a device to the medical device; determine an indication for the connected device; generate an advertisement comprising connection parameters for a potential communication session with the medical device and an indication that the medical device is connected by the established communication session between the connected device and the medical device; and output the advertisement comprising the indication that the medical device is connected by the established communication session between the connected device and the medical device.

Clause 19: The medical device of clause 18, where the processing circuitry is further configured to: receive, with the telemetry circuitry and using the established communication session with the connected device, a request for information from the external device; and output, with the telemetry circuitry and using the established communication session with the connected device, information responsive to the request.

Clause 20: The medical device of any of clauses 18-19, wherein the advertisement is a first advertisement and wherein, to establish the communication session to connect the connected device to the medical device, the processing circuitry is further configured to: output, with the telemetry circuitry, a second advertisement comprising connection parameters for the telemetry circuitry, wherein the connected device is configured to establish the communication session between the medical device and the connected device using the connection parameters of the second advertisement.

Clause 21: The medical device of any of clauses 18-20, wherein, to determine the indication for the connected device, the processing circuitry is further configured to determine a prioritizing bit assigned to the connected device.

Clause 22: The medical device of any of clauses 18-21, wherein the connected device comprises a clinician programmer.

Clause 23: The medical device of any of clauses 18-21, wherein the connected device comprises a patient programmer.

Clause 24: The medical device of any of clauses 18-21, wherein the connected device comprises a recharger device.

Clause 25: The medical device of any of clauses 18-21, wherein the external device comprises a mobile device.

Clause 26: The medical device of any of clauses 18-25, wherein the advertisement comprises a Bluetooth low energy advertisement.

Clause 27: The medical device of any of clauses 18-26, wherein the medical device comprises an implantable medical device.

Clause 28: The medical device of any of clauses 18-27, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 29: A method comprising: establishing, by processing circuitry, a communication session to connect a device to a medical device; determining, by the processing circuitry, an indication for the connected device; generating, by the processing circuitry, an advertisement comprising connection parameters for a potential communication session with the medical device and an indication that the medical device is connected by the established communication session between the connected device and the medical device; and outputting, by the processing circuitry, the advertisement comprising the indication that the medical device is connected by the established communication session between the connected device and the medical device.

Clause 30: A computer-readable storage medium having stored thereon instructions that, when executed, cause processing circuitry to: establish a communication session to connect a device to a medical device; determine an indication for the connected device; generate an advertisement comprising connection parameters for a potential communication session with the medical device and an indication that the medical device is connected by an established communication session between the connected device and the medical device; and output the advertisement comprising the indication that the medical device is connected by the established communication session between the connected device and the medical device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system comprising:
   telemetry circuitry configured for communication between a medical device and an external device associated with the medical device; and
   processing circuitry configured to:
      receive, with the telemetry circuitry, an advertisement from the medical device, the advertisement comprising connection parameters for a potential communication session with the medical device and an indication that the medical device is connected by an established communication session between the medical device and a connected device;
      identify the connected device using the indication of the advertisement;
      initiate a communication session between the telemetry circuitry and the connected device; and
      output, with the telemetry circuitry and using the communication session between the telemetry circuitry and the connected device, a request for information from the medical device.

2. The system of claim 1, wherein the advertisement is a first advertisement and wherein, to initiate the communication session between the telemetry circuitry and the connected device, the processing circuitry is further configured to:
   receive, with the telemetry circuitry, a second advertisement indicating connection parameters for the communication session with the connected device; and
   establish, with the telemetry circuitry, the communication session with the connected device using the second advertisement.

3. The system of claim 2, wherein the connected device is configured to output the second advertisement at an advertisement interval that is less than an advertisement interval of the first advertisement.

4. The system of claim 1, wherein the processing circuitry is further configured to receive, with the telemetry circuitry and using the communication session with the connected device, information responsive to the request for information.

5. The system of claim 4, wherein the connected device is configured to:
   output, using the established communication session between the medical device and the connected device, the request to the medical device;
   receive, using the established communication session between the medical device and the connected device, the information; and
   output, using the communication session between the telemetry circuitry and the connected device, the information to the telemetry circuitry.

6. The system of claim 1, wherein, to identify the connected device using the indication of the advertisement, the processing circuitry is further configured to match the indication of the advertisement with a prioritizing bit assigned to the connected device.

7. The system of claim 1, wherein the connected device comprises a clinician programmer or a patient programmer.

8. The system of claim 1, wherein the advertisement comprises a Bluetooth low energy advertisement.

9. The system of claim 1, wherein the medical device comprises an implantable medical device.

10. The system of claim 1,
    wherein the telemetry circuitry and the processing circuitry are arranged in the external device; or
    wherein the processing circuitry is arranged in the external device and the telemetry circuitry is arranged outside of the external device.

11. The system of claim 1, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

12. A method comprising:
    receiving, by processing circuitry, an advertisement from a medical device, the advertisement comprising connection parameters for a potential communication session with the medical device and an indication that the medical device is connected by an established communication session with a connected device;
    identifying, by the processing circuitry, the connected device using the indication of the advertisement;
    initiating, by the processing circuitry, a communication session with the connected device; and
    outputting, by the processing circuitry and using the communication session with the connected device, a request for information from the medical device.

13. The method of claim 12, wherein the advertisement is a first advertisement and wherein initiating the communication session comprises:
    receiving a second advertisement indicating connection parameters for the communication session with the connected device; and
    establishing the communication session with the connected device using the second advertisement.

14. The method of claim 13, wherein the connected device is configured to output the second advertisement at an advertisement interval that is less than an advertisement interval of the first advertisement.

15. The method of claim 12, further comprising receiving, using the communication session with the connected device, information responsive to the request for information.

16. The method of claim 12, wherein identifying the connected device using the indication of the advertisement comprises matching the indication of the advertisement with a prioritizing bit assigned to the connected device.

17. The method of claim 12, wherein the connected device comprises a clinician programmer or a patient programmer.

18. The method of claim 12, wherein the advertisement comprises a Bluetooth low energy advertisement.

19. The method of claim 12, wherein the medical device comprises an implantable medical device.

20. A non-transitory computer-readable storage medium having stored thereon instructions that, when executed, cause processing circuitry to:
- receive an advertisement from a medical device, the advertisement comprising connection parameters for a potential communication session with the medical device and an indication that the medical device is connected by an established communication session with a connected device;
- identify the connected device using the indication of the advertisement;
- initiate a communication session with the connected device; and
- output, using the communication session with the connected device, a request for information from the medical device.

* * * * *